United States Patent [19]

Sonnenberg

[11] 4,024,092

[45] May 17, 1977

[54] POLYMER COMPOSITIONS CONTAINING STILBENE HALIDE ADDITIVES

[75] Inventor: Fred Sonnenberg, Worcester, Mass.

[73] Assignee: Foster Grant Co., Inc., Leominster, Mass.

[22] Filed: June 4, 1976

[21] Appl. No.: 692,832

Related U.S. Application Data

[63] Continuation-in-part of Ser. No. 639,567, Dec. 10, 1975, abandoned.

[52] U.S. Cl. .................... 260/2.5 FP; 260/45.7 RT; 260/DIG. 24
[51] Int. Cl.² .......................................... C08K 5/03
[58] Field of Search ............... 260/45.7 R, 2.5 FP, 260/DIG. 24, 45.7 RL; 106/15 FP

[56] References Cited

UNITED STATES PATENTS

| | | | |
|---|---|---|---|
| 2,960,542 | 11/1960 | Le Suer et al. | 260/649 |
| 2,967,842 | 1/1961 | Roberts | 260/33.8 |
| 3,455,873 | 7/1969 | Jenkner | 260/45.7 |
| 3,826,766 | 7/1974 | Howell et al. | 260/2.5 |
| 3,883,481 | 5/1975 | Kopetz et al. | 260/45.75 |

OTHER PUBLICATIONS

Dictionary of Organic Compounds, 4th Edition, vol. 2, p. 923.

*Primary Examiner*—Donald E. Czaja
*Assistant Examiner*—R. A. White
*Attorney, Agent, or Firm*—Michael J. Tully

[57] ABSTRACT

Polymer compositions having enhanced oxygen index values as measured by ASTM Method D-2863-70 are disclosed, which compositions contain effective amounts of a bromo or chloro derivative of stilbene.

10 Claims, No Drawings

POLYMER COMPOSITIONS CONTAINING STILBENE HALIDE ADDITIVES

This application is a continuation -in-part of my application Ser. No. 639,567, filed Dec. 10, 1975, now abandoned.

BACKGROUND OF THE INVENTION

The present invention relates to the use of bromo or chloro derivatives of stilbene to enhance the oxygen index of alkenyl aromatic resins, particularly expandable alkenyl aromatic resins.

It is known in the art that the relative flammability of various plastic materials may be reduced by incorporating into the plastic one or more additives collectively referred to as flame retardants prior to heat processing of the plastic into shaped articles. This incorporation may be accomplished by physical blending such as using an extruder, or in some cases by polymerizing the resin forming monomer or monomer mixture in the presence of a dispersion or solution of the flame retardant.

Among the various flame retardants known in the art are certain compounds containing phosphorus, filler materials such as glass fiber, talc or alkali silicates, inorganic salts such as the borates or ammonium salts, and organic compounds containing halogen. A great many of the preferred organic compounds contain phosphorus, bromine or chlorine, alone or in combination, with the organic moiety being aliphatic, cycloaliphatic or aromatic. Common flame retardants of this latter category include such materials as tetrabromobutane, hexabromoethane, hexabromocyclohexane, tetrabromovinylcyclohexane, decabromodiphenyl ether, hexabromobenzene, decabromobiphenyl, dibromoneopentyl glycol, tetrabromobisphenol-A, tris-(2,3-dibromopropyl) phosphate and other materials. Chlorinated or mixed bromo-chloro homologues of many of these materials have also been successfully employed.

It is also known in the art that various additives incorporated into plastic material enhance the action of many flame retardants, although the precise mechanism of this enhancement is not known. Common additives include the oxides and sulfides of antimony, arsenic and bismuth, the most popular of this class being antimony oxide. Other known additives are categorized as free radical initiators and include thermally unstable organic compounds such as peroxides, nitroso and azo compounds, and structurally hindered compounds.

Within this rather general context, the use of nucleus brominated or mixed bromo-chloro halogenated derivatives of di-aromatic compounds as a flame retardant is disclosed in U.S. Pat. No. 3,141,860. According to the patent disclosure a mixture of the halogen compound, which must contain at least 3 bromine atoms attached to an aromatic nucleus and also contain at least 50% by weight bromine, and antimony trioxide imparts suitable flame retardancy to polyolefin plastics. U.S. Pat. No. 3,331,797 discloses flame resistant polyolefin compositions comprising a mixed system of antimony trioxide, a chlorinated paraffin and a halogenated aromatic compound which includes a polybromo diphenyl ethers as well as di-aromatic compounds taught in U.S. Pat. No. 3,141,860, discussed above. While these halogenated additives are effective for the purposes taught in the patents, they are relatively difficult to synthesize and are relatively expensive due in large measure to the high bromine content. Also, because relatively large quantities (5 to 20% by weight) of the halogenated additive must be used to achieve desired results, the additives can adversely affect the physical properties of the polymers.

Whereas these and other prior art flame retardant compositions are generally effective, it is most desirable to provide new flame retardant compositions containing compounds which offer relatively greater efficiency and are readily synthesized and readily available.

SUMMARY OF THE INVENTION

Alkenyl aromatic polymer compositions having a relatively high Limiting Oxygen Index value as measured by the Oxygen Index Method (ASTM D 2863-70) are prepared by incorporating into the polymer composition a minor but effective amount of an alpha, beta bromine or chlorine derivative of stilbene as hereinafter defined. These compositions may contain a mixture of these halogenated stilbene with other conventional flame retardants and/or synergists. Polymer forms particularly susceptible to oxygen index improvement according to this invention include expandable polystyrene compositions containing a small amount of blowing agent which when heated above the boiling point of the blowing agent and above the softening point of the polystyrene are caused to expand to a porous or cellular mass.

DETAILED DESCRIPTION

The polymer compositions of the present invention contain bromo or chloro alpha, beta addition products of stilbene to enhance the oxygen index value of said compositions to surprisingly high levels. Stilbene is a commerically available compound which is manufactured as a by-product in the dehydrogenation of ethyl benzene during the manufacture of styrene. Stilbene may be also synthesized by passing toluene over hot lead oxide.

Halogenated derivatives of stilbene which are particularly effective for the purpose of this invention are materials corresponding to the following structural formula:

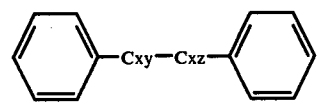

wherein
x is selected from the group consisting of H and Cl;
y is selected from the group consisting of H, Br and Cl;
z is selected from the group consisting of Br and Cl;
provided that when y or z is Br, x is H.

Examples of suitable materials within the above formula include stilbene bromide, stilbene dibromide, stilbene dichloride, and stilbene tetrachloride. These compounds can be prepared by methods known in the art using either stilbene or bibenzyl as starting materials. For example, the halides are readily synthesized from stilbene by the addition reaction of stilbene in the liquid phase or in solution with the appropriate molar quantities of halogen gas. The halides may be prepared from bibenzyl by a substitution reaction of bibenzyl with halogen gas or a halogen acid in an appropriate solvent. These compounds should be prepared under conditions such that no halogenation occurs at the aromatic rings.

The following example illustrates a suitable method for the preparation of stilbene dibromide.

EXAMPLE 1

A solution of 45 g. (0.25 mole) of trans-stilbene in 750 ml. of ether is prepared in a 1-1, three-necked round-bottom flask fitted with a reflux condenser, an efficient mechanical stirrer, and a dropping funnel. To the well-stirred solution there is added 13.8 ml (43 g; 0.27 mole) of bromine, during the course of 10 minutes. A solid begins to separate in 5 minutes, but stirring is continued for 1 hour. The product is collected on a Buchner funnel and washed with ether until it is white. The yield of stilbene dibromide, melting at 235°–237° ,is 65.8 – 69.1 g. (77–81%). The product contains about 47% by weight bromine.

One widely accepted technique for determining the relative flammability of various plastic materials is the Oxygen Index Method designated as ASTM 2863-70, by which method is measured the minimum concentration of oxygen in a slowly rising mixture of oxygen and nitrogen that will just support combustion. According to an article in Modern Plastics by Fenimore and Martin in November of 1966 which describes this method, an article is considered "self extinguishing" if its oxygen index is about 27 or higher, and it is subject to increased tendency to burn as the oxygen index decreases downward from about 27. Many plastics containing no flame retardant additives exhibit oxygen index values of less than 27, in many cases closer to 20.

It has been found that relatively modest amounts of the stilbene derivatives of the present invention provide dramatic increases in the oxygen index values of polymeric materials in which they are incorporated. For example, the use of stilbene dibromide in expandable polystyrene compositions at impregnation levels as low as about 0.5% weight increases the oxygen index of such compositions from the low twenties to values in the order of 30.

Polymers particularly susceptible to oxygen index enhancement according to the present invention include any of the normally solid thermoplastic homopolymers or copolymers containing in chemically combined form at least 55% by weight of a monoalkenyl aromatic compound having the general formula:

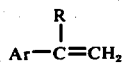

wherein Ar represents a monovalent aromatic radical and R represents hydrogen or the methyl radical. Examples of such alkenyl aromatic resins are the solid homopolymers of styrene, alpha-methyl styrene, ar-vinyl toluene, ar-vinyl xylene and ar-ethylvinyl benzene, and copolymers or one or more of the above with each other or with other copolymerizable monomers such as acrylonitrile divinyl benzene, alkyl acrylates or methacrylates, olefins, and the like. Also encompassed are copolymers formed by polymerizing a monoalkenyl aromatic monomer in the presence of less than about 20% by weight of a rubbery butadiene or isoprene polymer, or other rubbery polymers such as ethylene/propylene copolymers or ethylene/propylene/non-conjugated diene terpolymers.

The advantages of oxygen index enhancement is best realized in expandable alkenyl aromatic resins which contain minor amounts in the order of about 3 to 10% by weight of a foaming agent in homogeneous dispersion. Suitable foaming agents include volatile organic compounds which may be liquids or gases at ordinary temperatures and pressures, and include such materials as pentane, hexane heptane, cyclopentane and other compounds having a boiling range in the order of about 15° to 100° C. These foamable compositions are well known in the art and may be prepared by suspension polymerization of the appropriate monomer or monomers in the presence of the volatile foaming agent, such as taught for example in U.S. Pat. No. 2,681,321 or 2,779,062, or by infusing the foaming agent into particles of the polymer as taught for example in U.S. Pat. No. 2,950,261. Such compositions may also be prepared by forming a physical mixture of the polymer and foaming agent such as in an extruder as taught in U.S. Pat. No. 2,669,751, although in this latter case, care should be exercised not to heat the composition containing the stilbene derivative compound above the decomposition temperature of such compound, i.e., above about 240° C.

When preparing foamable polymers by any of the above techniques the stilbene compounds of the present invention are advantageously incorporated into the compositions at the same time and by the same methods which are used to incorporate the foaming agent, i.e., by polymerizing in the presence of a mixture of the foaming agent and a fine dispersion or solution of stilbene halide, by infusing a mixture of the foaming agent and stilbene halide into preformed polymer, or by physically admixing with the preformed polymer a mixture or solution of the stilbene halide with the foaming agent. Of all these techniques, the infusion method is preferred because of the avoidance of any possible adverse effects of the stilbene halide in polymerization or extrusion operations.

The enhancement of oxygen index in expandable polymers is further realized by the inclusion of minor amounts of so called synergists in the composition, which synergists are generally stable at normal polymer processing temperatures, but which act as free radical initiators at temperatures encountered when the polymer composition is at or near the burning stage. Examples of suitable free radical additives include peroxide such as di cumyl peroxide and di-tertary butyl peroxide, azo compounds, nitroso compounds and other materials of like nature. Suitable organic peroxides are those containing at least six carbon atoms and exhibiting a half life of at least 2 hours at 100° C., more preferably at least 5 hours. Such additives are effectively employed at levels of from about 0.1 to 2% based on polymer weight.

The amount of stilbene halide which may be used in the present invention may vary depending on the nature of the polymeric material in which it is used and the degree of oxygen index enhancement desired. Because it is highly efficient, less of the stilbene halide is required than is the case with many other common flame retardants, particularly the aromatic halides. Normally, from about 0.1 to 10% based on polymer weight is suitable for most application. In expandable polystyrene, less than 2% based on polymer weight e.g. from about 0.5 to 2% by weight, has proven highly effective. Mixtures of stilbene dibromide with stilbene dichloride and/or stilbene tetrachloride may also be used.

Typical additives which may be employed in addition to the stilbene halide's include the oxides and sulfides of antimony, arsenic and bismuth, the preferred species being antimony oxide. Various borates and ammonium salts may also be used. It is also within the scope of the present invention to employ other known organic halide flame retardants in admixture with stilbene halides, particularly the halogenated ring substituted derivatives of aromatic compounds which are stable at temperatures higher than the stilbene halides. Typical materials include hexabromobenzene, decabromodiphenyl ether, tetrabromovinylcyclohexane, and like compounds.

In some instances where improved stability at higher temperatures, i.e., in excess of 200° C., is required it may be desirable to include effective amounts of heat stabilizers into compositions containing the stilbene derivatives of the present invention. Suitable stabilizers include those materials normally used to stabilize polyvinyl chloride resins, for example, lead salts such as lead carbonate, calcium and zinc salts such as the stearates, epoxides such as octylepoxy stearate, organotins such as dibutyl tin carboxylate or octyl tin mercaptide, and similar materials.

The following examples describe a number of ways for practice of the invention and illustrate certain of its advantages, but are not to be construed as limiting the invention.

EXAMPLE 2

This example illustrates the preparation of a control sample of expandable beads which does not contain the additives of the present invention.

Polystyrene beads having an average particle size of less than 50 U.S. Mesh were impregnated with foaming agent according to the following procedure:

50 mls. of distilled water and 50 g. of the polystyrene beads were introduced into a pressure tight 10 oz. bottle. Also added were 0.0025 g. of calcium hydroxide, 1.5 g. of an aqueous slurry containing tricalcium phosphate as a suspending agent at a level of about 37.5% solids and 5.85 mls of normal pentane. After the bottle was sealed air tight, it was tumbled in a heated oil bath at 110° C. for a period of 4 hours. After this time, the contents were cooled and the pressure was released. The contents of the bottle were removed, washed, centrifuged and dried.

EXAMPLE 3

Example 2 was repeated using the same formulation and impregnation techniques except that the bottle charge included 0.75 g. of stilbene alpha, beta dibromide (1.5% by weight beads) in the form of a finely divided powder and 1.0 ml. of a 1% aqueous solution of dodecylbenzene sodium sulphonate as a dispersing aid.

EXAMPLE 4

Example 2 was repeated using the same formulation and impregnation techniques except that the bottle charge included 0.75 g. of stilbene, alpha, beta dibromide powder, 1.0 ml of a 1% aqueous solution dodecylbenzene sodium sulfonate, and 0.25 g. of dicumyl peroxide (0.5% by weight beads).

EXAMPLE 5

Example 2 was repeated using the same formulation and impregnation techniques except that the formulation included 0.75 g. of finely divided stilbene alpha, beta dichloride and 0.25 g. of dicumyl peroxide.

EXAMPLE 6

Example 2 was repeated using the same formulation and impregnation techniques except that the formulation included 0.25 g. of finely divided stilbene alpha, beta dibromide (0.5% by weight beads) and 0.05 g. of dicumyl peroxide (0.1% by weight beads).

EXAMPLE 7 - 9

Three different samples of expandable beads were prepared using the same formulation and impregnation techniques as Example 2 and including a 1.5% by weight beads charge of various prior art flame retardants in combination with a 0.5% by weight beads charge of dicumyl peroxide. The various flame retardants employed were as follows:

Example 7 — 1,2,3,4-tetrabromobutane (about 85% Br)

Example 8 — hexabromobenzene (about 89% Br)

Example 9 — pentabromophenyoxybenzene (about 71% Br)

EXAMPLE 10

Polystyrene beads having an average particle size of less than 50 U.S. Mesh were impregnated according to the following procedure:

7500 mls of distilled water and 7500 g of the polystyrene beads were introduced into a pressure tight 3 gallon pressure autoclave. Also added were 200 g. of an aqueous slurry containing tricalcium phosphate as a suspending agent at a level of about 35% solids, 112.5g. of stilbene alpha, beta dibromide powder (1.5% by weight beads), 1.0 g. of dodecylbenzene sodium sulphonate, 37.5 g. of dicumyl peroxide (0.5% by weight beads), and937 mls. of normal pentane. After the autoclave was sealed, stirring was commenced and the contents heated to about 225° F. for a period of 6 hours. After this time, the contents were cooled and the pressure was released. The contents of the autoclave were removed, washed, centrifuged and dried.

Oxygen Index values on the various samples prepared according to Examples 2 through 10 were obtained as follows: The impregnated beads were treated with steam and hot water on a screen to form a prefoamed bead having a density of approximately 1 pound per cubic foot. This material was then aged for about 24 hours and placed in a mold and expanded into a block by the application of steam for approximately 5 minutes, followed by cooling. Sections having dimensions of about ½ inch by ½ inch by 6 inches and suitable for testing in accordance with ASTM 2863-70 were cut from the inner portions of the expanded block. These sections were also about 1 pound per cubic foot density.

Comparative oxygen index values on foamed samples prepared from the beads of Examples 2 – 10 are reported in Table 1

TABLE 1

| Sample | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- |
| Oxygen Index | 23 | 31.7 | 36.2 | 28.1 | 29.1 | 35.9 | 25.7 | 27.0 | 41.5 |

As can be seen from Table 1, all samples echibited an improvement in Limiting Oxygen Index (LOI) value as opposed to the control sample of Example 2. Note, however, that the beads of Examples 3-6 and 10 are superior in terms of LOI when compared with the prior art materials of Examples 8 and 9. Examples 3 and 4 compare quite favorably with Example 7 when one considers that stilbene dibromide contains only about 47% by weight bromine, whereas the 1,2,3,4-tetrabromobutane contains about 85% by weight bromine. The very high oxygen index value achieved in Example 10 illustrates the improved impregnation efficiency of a larger scale impregnation process as opposed to the smaller scale process described for Example 4.

The present invention has been described with reference to the use of the stilbene derivatives in combination with alkenyl aromatic polymers. However, it is recognized that these derivatives may also be successfully employed to enhance the oxygen index of other polymers or waxy materials, particularly, polyolefins such as polyethylene or polypropylene, polyamides, polyurethanes, polyesters and like materials which can be processed at temperatures below about 240° C. They may also be used in polymeric adhesives or coating compositions, particularly those that are not processed at high temperatures. Also, halogenated homologues of the stilbene derivatives are intended to be encompassed by this invention, such homologues including from about 1 to 6 straight or branched chained lower alkyl, alkoxy or phenyl substituents on the aromatic nucleus, as well as mixtures of such homologues with the stilbene derivatives.

While the invention has been described with reference to the embodiments disclosed herein, it is not confined to the embodiments set forth, and this application is intended to cover such operative modifications, changes and equivalents determined with reference to the following claims. What I claim is:

1. An alkenyl aromatic polymer composition having dispersed therein from about 0.1 to about 10% by weight of the polymer of an additive compound having the formula:

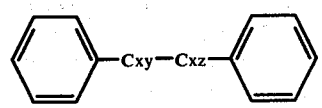

wherein:
x is selected from the group consisting of H and Cl
y is selected from the group consisting of H, Br and Cl,
z is selected from the group consisting of Br and Cl, provided that when y or z is Br, x is H.

2. The composition of claim 1, wherein said additive compound is selected from the group consisting of alpha, beta-stilbene dibromide, alpha, beta-stilbene dichloride and tetrachloro stilbene, said additive compound being present in an amount sufficient to enhance the oxygen index of said polymer composition to a level of about 27 or greater as measured according to ASTM 2863-70.

3. The composition of claim 2 wherein said alkenyl aromatic polymer is polystyrene and said additive compound is alpha, beta stilbene dibromide.

4. The composition of claim 1 in solid form and containing an expanding agent present in an amount sufficient to provide an expanded polymer composition upon the application of heat.

5. The composition of claim 4 wherein said expanding agent is a hydrocarbon having a boiling point of less than about 100° C.

6. The composition of claim 4 additionally containing from about 0.1 to 2.0% by weight of said polymer of an organic peroxide.

7. The composition of claim 4, wherein said additive compound is selected from the group consisting of alpha, beta stilbene dibromide, alpha, beta stilbene dichloride and stilbene tetrachloride, and is present in an amount sufficient to enhance to oxygen index of said polymer composition to a level of about 27 or greater as measured according to ASTM 2863-70.

8. The composition of claim 7, wherein said alkenyl aromatic polymer is polystyrene and said additive compound is alpha, beta stilbene dibromide.

9. Polymer foams prepared by heating the composition of claim 4.

10. Polymer foams prepared by heating the composition of claim 8.

* * * * *